US011038928B2

(12) United States Patent
Udoh (10) Patent No.: US 11,038,928 B2
(45) Date of Patent: Jun. 15, 2021

(54) SECURITY REGISTRY AND TRACKING SYSTEM (SRTS)

(71) Applicant: Kenneth Udoh, Johannesburg (ZA)

(72) Inventor: Kenneth Udoh, Johannesburg (ZA)

(*) Notice: Subject to any disclaimer, the term of this patent is extended or adjusted under 35 U.S.C. 154(b) by 0 days.

(21) Appl. No.: 16/606,809

(22) PCT Filed: Apr. 26, 2018

(86) PCT No.: PCT/ZA2018/050018
§ 371 (c)(1),
(2) Date: Oct. 21, 2019

(87) PCT Pub. No.: WO2018/218261
PCT Pub. Date: Nov. 29, 2018

(65) Prior Publication Data
US 2020/0389503 A1 Dec. 10, 2020

(30) Foreign Application Priority Data
Apr. 21, 2017 (ZA) .............................. 2017002811

(51) Int. Cl.
| | |
|---|---|
| *H04L 29/06* | (2006.01) |
| *H04W 4/029* | (2018.01) |
| *G01S 19/14* | (2010.01) |
| *G06Q 50/26* | (2012.01) |
| *H04W 8/02* | (2009.01) |

(Continued)

(52) U.S. Cl.
CPC ............ *H04L 63/308* (2013.01); *G01S 19/14* (2013.01); *G06Q 50/265* (2013.01); *H04W 4/029* (2018.02); *H04W 8/02* (2013.01); *H04W 8/18* (2013.01); *H04W 8/24* (2013.01); *H04W 12/80* (2021.01)

(58) Field of Classification Search
CPC .. H04L 63/308; H04W 4/029; H04W 12/007; H04W 8/02; H04W 8/18; H04W 8/24; G01S 19/14; G06Q 50/265
See application file for complete search history.

(56) References Cited

U.S. PATENT DOCUMENTS

| | | | |
|---|---|---|---|
| 9,504,004 B1 * | 11/2016 | Auvenshine | .......... H04W 4/029 |
| 2009/0286510 A1 * | 11/2009 | Huber | .................. H04W 4/027 |
| | | | 455/410 |

(Continued)

*Primary Examiner* — Ernest G Tacsik (74) *Attorney, Agent, or Firm* — Thomas | Horstemeyer, LLP (57) ABSTRACT

A security registry and tracking system (SRTS) is described that aims to address a need for security by helping law enforcement identify individuals through tracking of movement of mobile devices, such as cellular phones. A computing device is directed to communicate with a mobile networking and tracking system configured to identify a mobile device entering a premise of a subscriber network; obtain an identification number of the mobile device; store the identification number of the mobile device and forward the identification number to at least one governmental authority system; and receive authentication data from the at least one governmental authority system. Further, the computing device can generate population records and identification databases based at least in part on the location information and the data transferred between the mobile networking and tracking provider and the security registry.

3 Claims, 13 Drawing Sheets

(51) Int. Cl.
*H04W 8/18* (2009.01)
*H04W 8/24* (2009.01)
*H04W 12/80* (2021.01)

(56) References Cited

U.S. PATENT DOCUMENTS

| | | | | |
|---|---|---|---|---|
| 2010/0289662 | A1* | 11/2010 | Dasilva | F16P 3/147 340/686.6 |
| 2013/0007728 | A1* | 1/2013 | Oh | G06F 8/62 717/178 |
| 2017/0223061 | A1* | 8/2017 | Fiorillo | H04L 63/306 |

* cited by examiner

Images as per pages

Page 2: SRTS Central Diagram

Page 3: SRTS Bridge Diagram

Page 4: SRTS Tracking Diagram

Page 5: SRTS Log Diagram

Page 6: SRTS Client Diagram

SECURITY REGISTRY AND TRACKING SYSTEM (SRTS)

CROSS-REFERENCE TO RELATED APPLICATIONS

This application is a § 371 national phase application of PCT/ZA2018/050018 filed Apr. 26, 2018 entitled "SECURITY REGISTRY AND TRACKING SYSTEM (SRTS)," which claims the benefit of and priority to South African Patent Application No. 2017/002811 filed Apr. 21, 2017, the contents of which being incorporated by reference in their entireties herein.

BACKGROUND

There is a need for security within the global community by helping law enforcements to identify criminals or other persons by tracking their movements through cellphone and electronic device tracking, and location tracking, by registering identifications of a person entering the subscriber's premises.

BRIEF SUMMARY OF INVENTION

The SRTS is an integrated system that communicates with external systems such as the Mobile networks communication authorities of which they in turn will transfer data between the mobile networks and SRTS in order to transact data between users and the central Government/Authority Systems that maintains the population records and identification Databases. The System involves the identification of subjects and data management by Government/Authorities. The SRTS consists of multiple software and sub Systems including database Systems, Web Services, Windows Services, NoSQL Software and Web Applications that is used to capture, store and manage user data on the subscriber's System and on the Government/Authority database Systems and all communications/interactions are done in real time.

The SRTS aims to address the needs for security within the Global Community by helping law enforcements to identify criminals or other persons by tracking their movements through cellphone/device tracking and location tracking by registering identifications of a person entering the subscriber's premises, which is then sent to the authorities for data management. The SRTS can also be used by Government/Authorities to profile Individuals by their movements, it can also be used to help find missing persons by identifying their last known locations and can also be used for general population management and control.

The SRTS will also be used to generate revenue by charging subscribers/Vendors of the System a premium. It does not store subject's data but simply transfers the data between the Government/Authority Systems and the Subscriber's/Vendor's Systems and will be transferred securely via network or the internet by using the available and most efficient data security technologies. IT will store transactional data in order to invoice the subscriber on an agreed interval, manage the subscriber's information and access.

SRTS can be integrated into an existing ERP System (Enterprise Studio), which then can be provided as a complete solution to an Enterprise to manage their business activities in one integrated System that consists of other web applications (Modules).

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
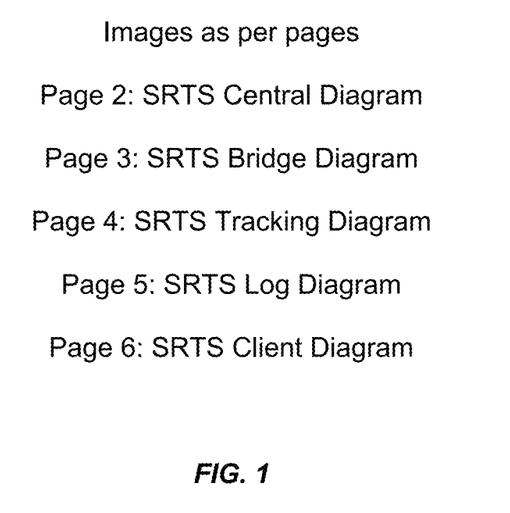
FIGS. 1-17 are various schematic diagrams of a security registry and tracking system (SRTS) according to various embodiments of the present disclosure.
Figure 2:
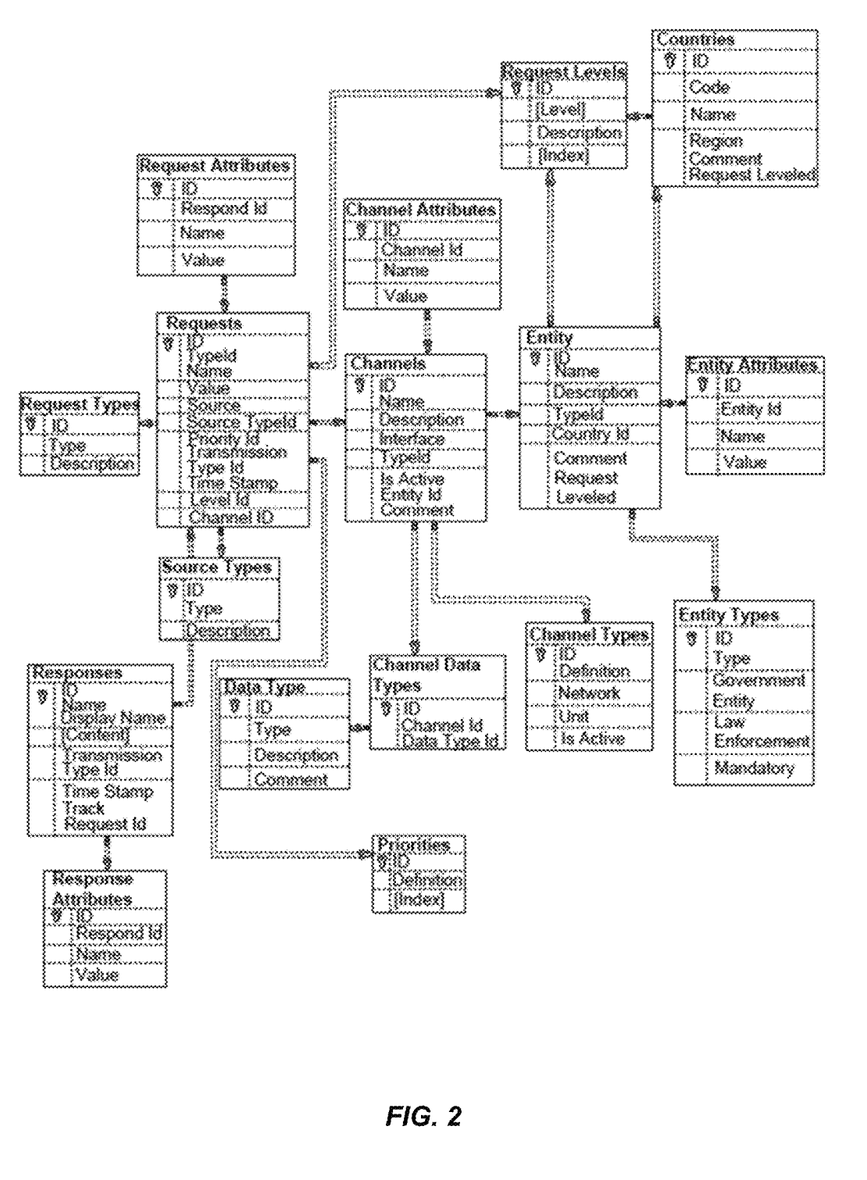
Figure 3:
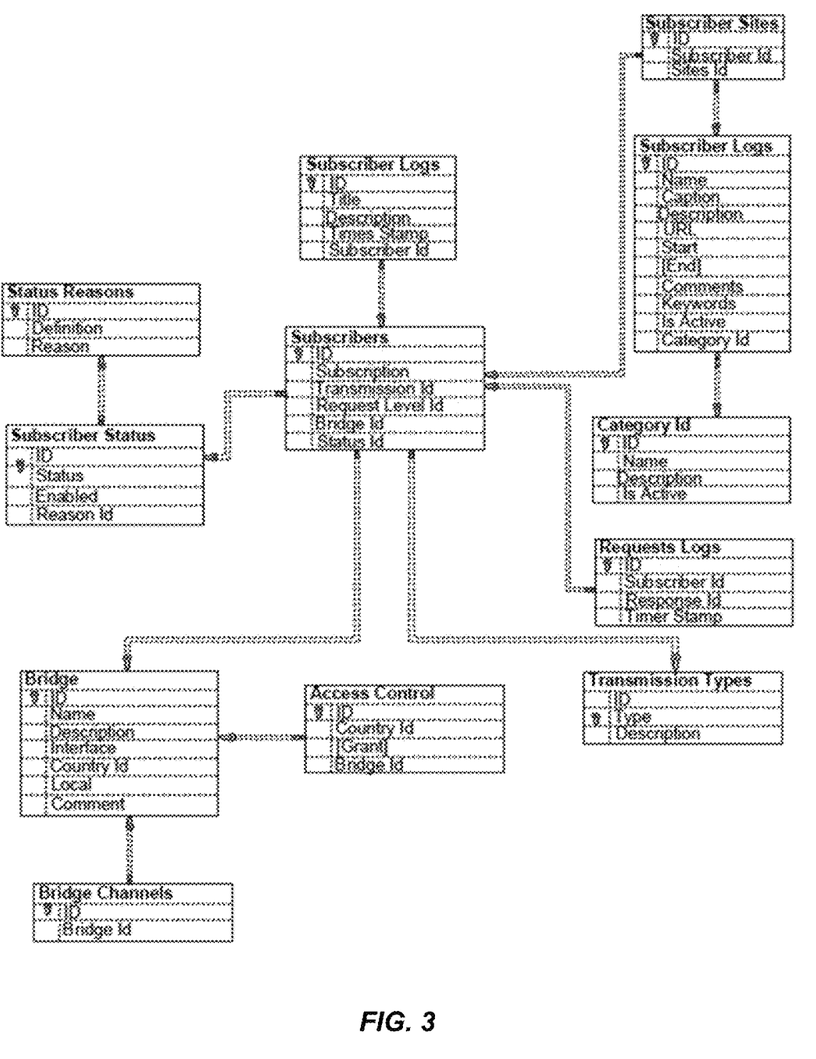
Figure 4:
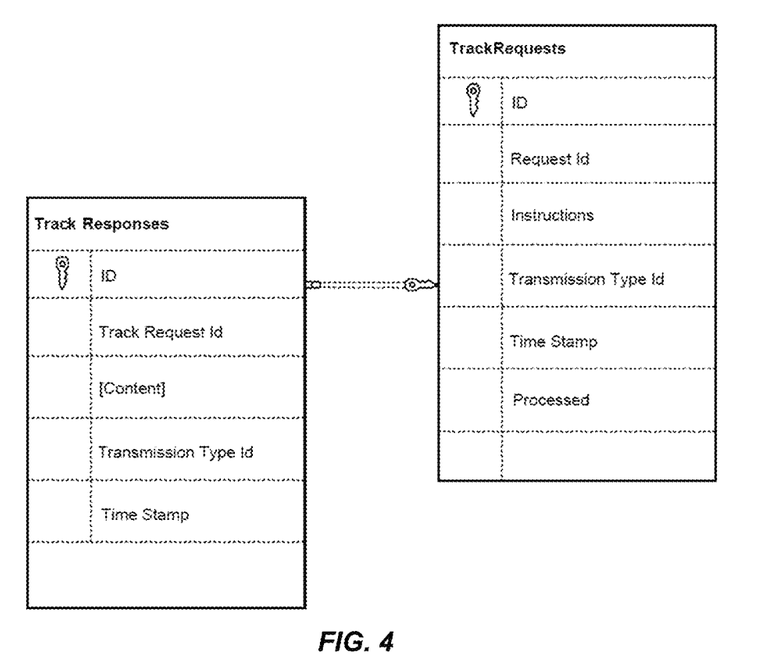
Figure 5:
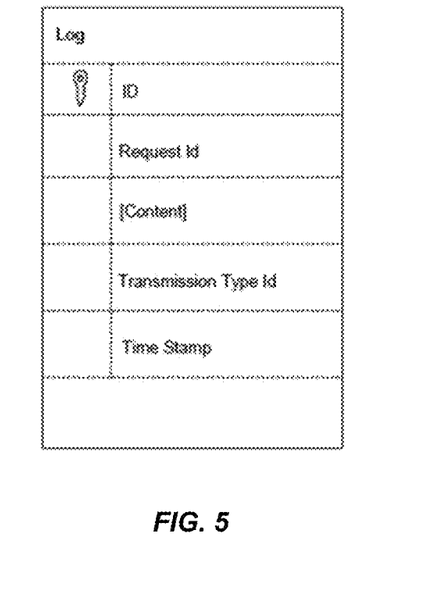
Figure 6:
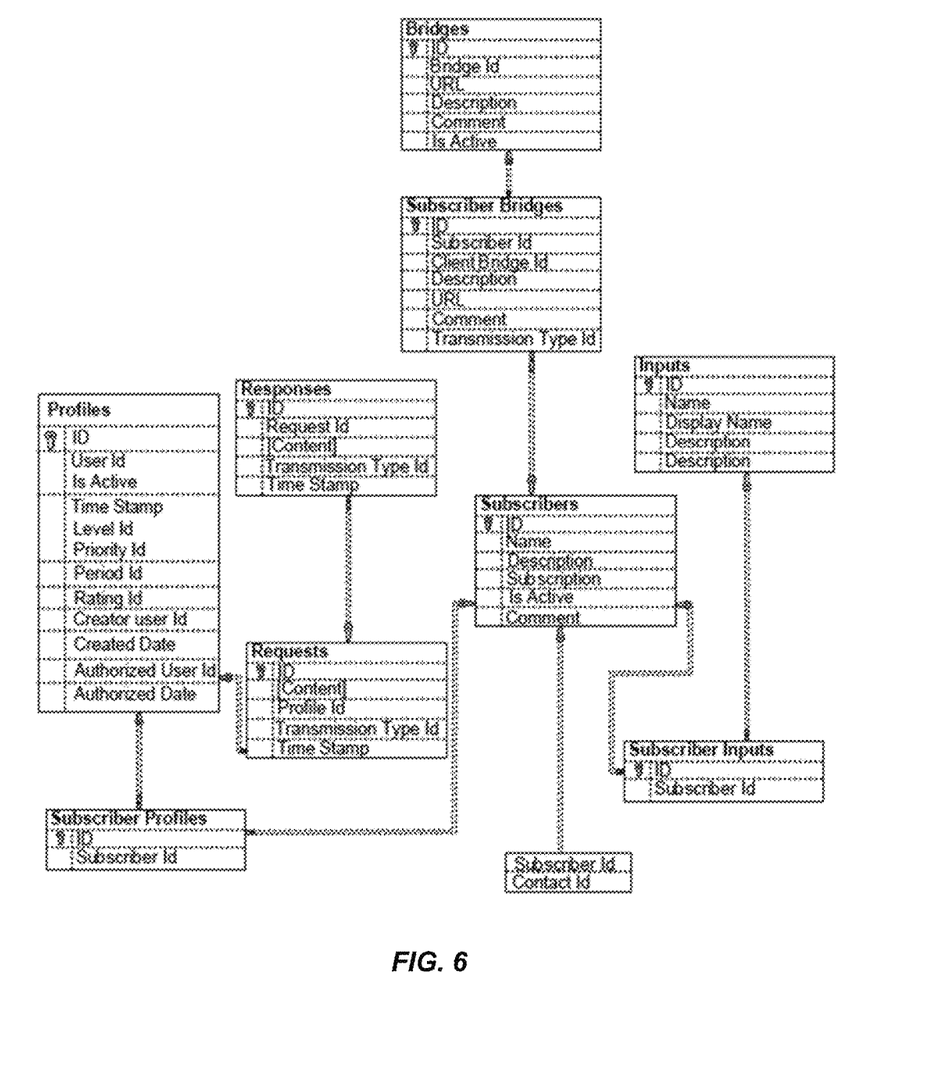
Figure 7:
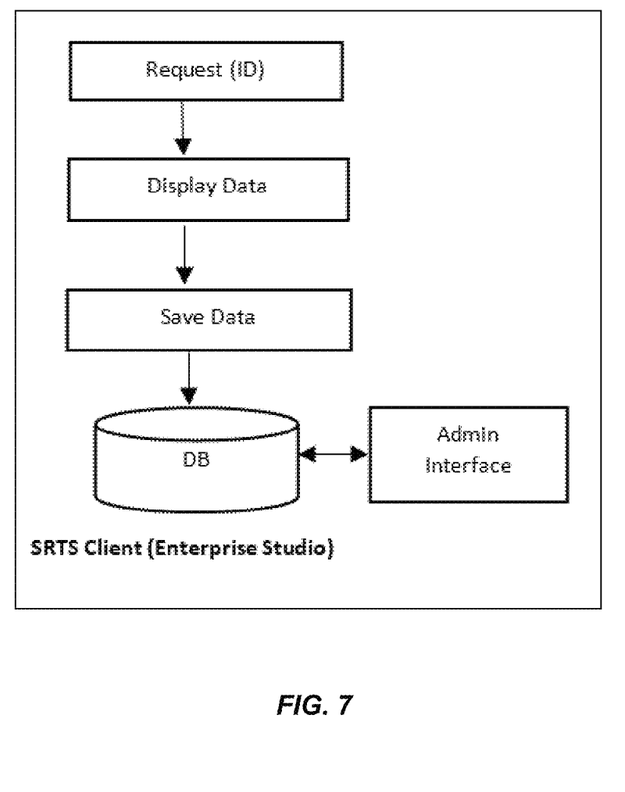
Figure 8:
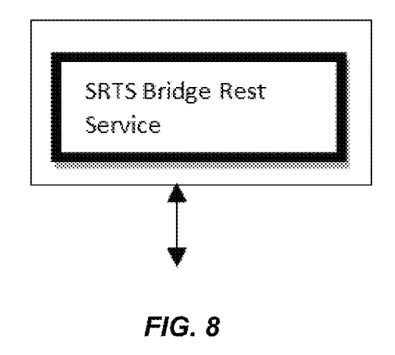
Figure 9:
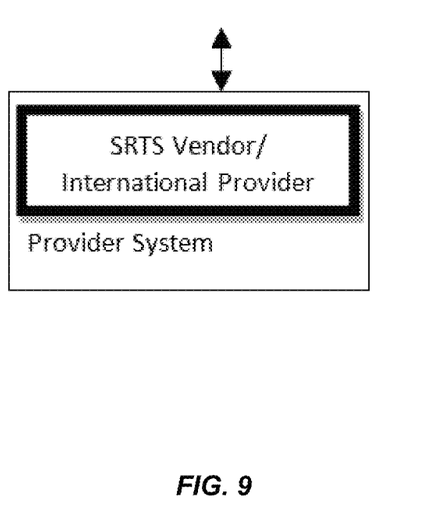
Figure 10:
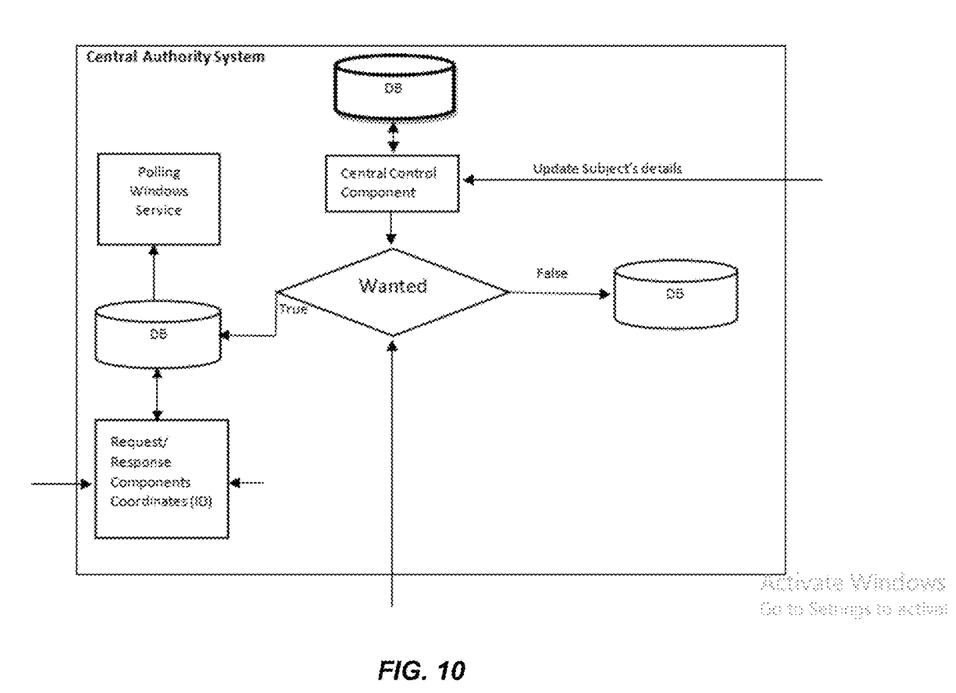
Figure 11:
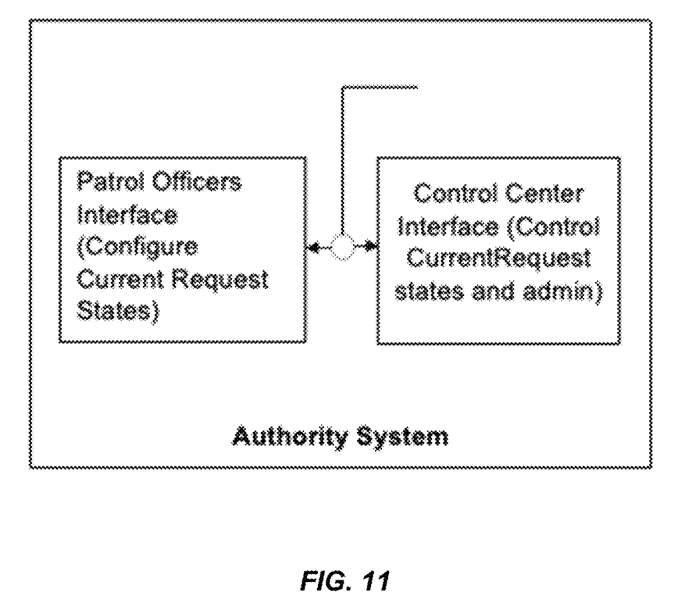
Figure 12:
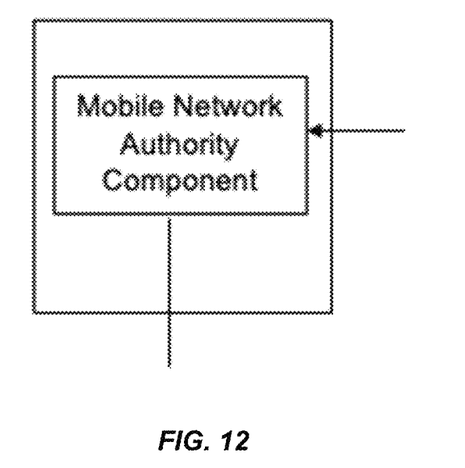
Figure 13:
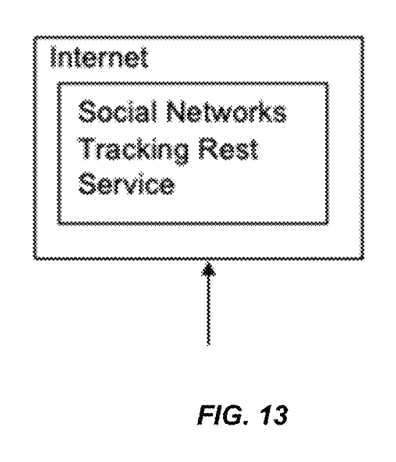
Figure 14:
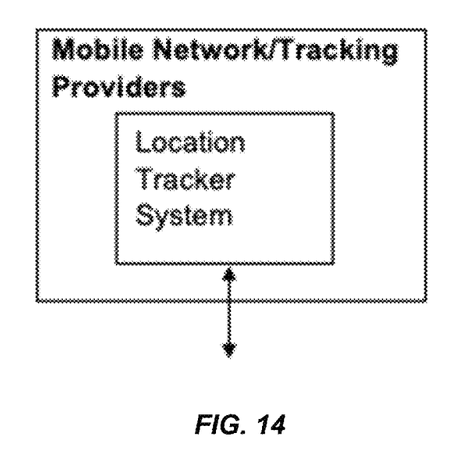
Figure 15:
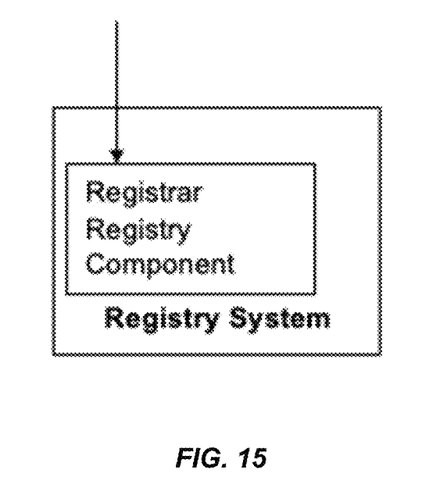
Figure 16:
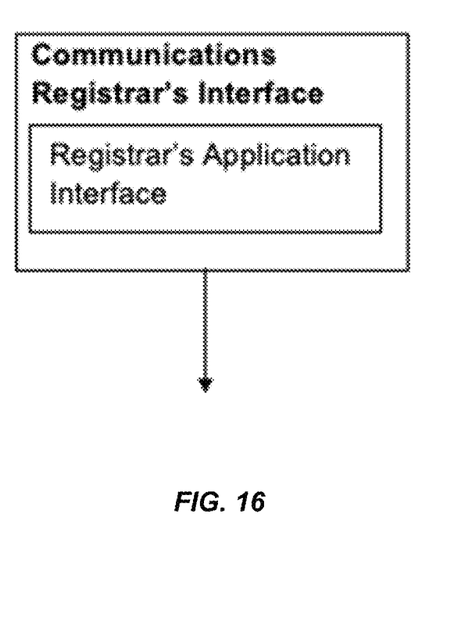
Figure 17:
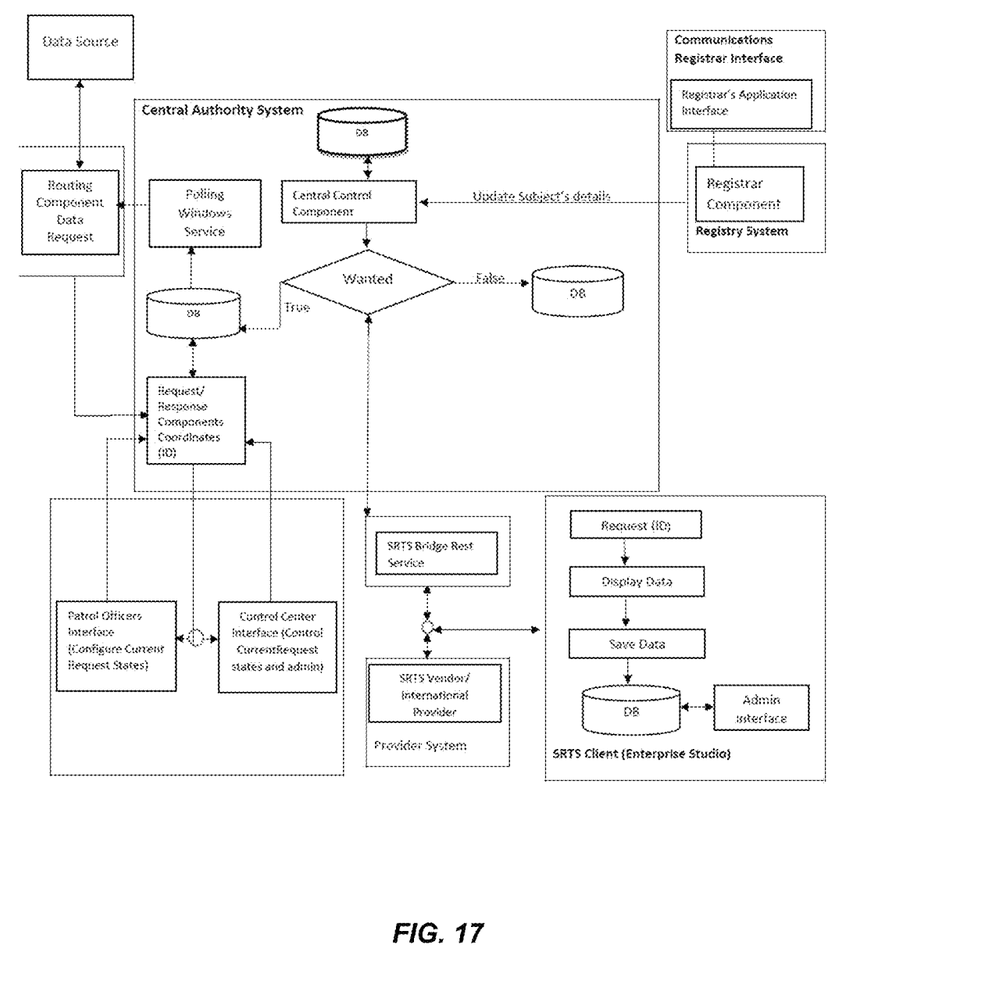

System Operations. Subscriber System (Enterprise Studio).

The Subscriber which could be any enterprise that requires access control to their premises will establish an environment of which the system will operate. The System consists of a Database of which the response data from the Government/Authority Systems will be stored, managed and reports can be generated from the records of data residing in the Database, A web Application integrated with a Rest Web Service will integrate the Government/Authority Systems and the Subscriber's System by transferring data between the two environments in real-time.

The Subscriber's User interface will be a web application, written using a JavaScript Framework for performance optimization and scalability which can be accessed via the subscriber's network, if the subscriber has franchises, branches or substructures then the Application will be installed and configured to suit their environments.

SRTS will be lightweight and will transmit data in real-time, but Load balancers and other network technologies and configuration tools will be used to optimize the performance on large Subscriber's Networks if needed.

The Subscriber will register every individual or groups requesting entry to their premises by requesting their identification number (ID, Passport or Cellphone numbers), capturing it into the system and then forwarding the data including the Address and GPS coordinates of the Subscriber's premises for verification by the Government/Authority Systems. Then Government/Authority Systems will respond with data including the registered details and Official Image of the Individuals on the Government/Authority Systems. If the Subject is wanted by the Government/Authority (Police), then SRTS will initiate the tracking process and will not alert the System user of the initiated process, but will alert the Control Center of the Subject's current GPS location and physical address.

If there is a security bridge at the premises the subscriber will have the ability to identify the perpetrators on their system and forward their details including their picture, reasons for submissions and comments regarding the submissions to the Police immediately, The Police will then analyze the data received from the Subscriber and flag the Subject/s for tracking if required.

The Subscriber will be able to capture visitors by groups or individually for data accuracy. When the Data is returned from the Government/Authority Systems, the user will be able to validate the visitor's details and picture in person with the image displayed on the user interface to ensure that security is not compromised. Government/Authority may request copies of these data for analysis.

SRTS Bridge Rest Service.

The SRTS Bridge Rest Service provides an integration Bridge between the Subscriber System (Enterprise Studio) and the Central Control Rest Service or SRTS Vendors/International providers and their Systems. The Vendors will have access by subscriptions and will be able to render services to their subscribers by sending/receiving requests/responses through the SRTS Bridge Rest Service.

The SRTS Bridge Rest Service will be used as an administrative tool to manage/record traffics from the Subscribers and Vendors, record usage and provide a secure gateway to the Central Control Rest Service.

Provider System. SRTS Vendor/International Providers.

SRTS Vendors/International providers is an external system that provides SRTS services to its users by transmitting data to and from the SRTS Bridge Rest Service. The Vendor could be an organization that validates or evaluates data by its identity e.g. Banks could use SRTS to validate or evaluate customer's transactions, Marketing agencies could use SRTS to collect and profile subjects' information or a Point Of Sale (POS) System could validate or evaluate Customers' identity when purchasing an item. The international provider could be another SRTS implementation in another country and integrates to the national SRTS via the SRTS Bridge or an international authority System that could use the National SRTS to validate or evaluate subjects' information.

If the subject's data is transmitted between SRTS implementations or law enforcements, then the subject's data will be in depth data transmission or as per configuration by the subject's hosting SRTS implementation.

Central Authority System.

The Central authority system is the main part of the S TS, it will integrate with the National Population database via a NoSQL application Server which is maintained by the Government/Authority. The Government/Authority System will respond with the requested data to a request by the Central Control Rest Web Service.

Control Rest Web Service:

The Central Control Rest Web Service is part of the SRTS which will integrate with the Government/Authority System and will manage the communication between the Polling System, the Subscriber's System, the Communication Registrar's Registry System and the Government/Authority System.

It also determines if the data received should be sent for polling on the Mobile Network or logged on the log Database based on the instructions from the Government/Authority System.

Log Database.

The Log Database stores records of individuals not flagged for polling by the Government/Authority System. It contains request data from the Subscribers, Vendors, and International Providers and can be used for analysis and profiling of Subjects.

Polling Windows Service.

The Polling Windows Service retrieves instruction data of Subjects flagged for Tracking from the Polling Database and transmits them to the Mobile Network Authority.

Request/Response Rest Web Service.

The Request/Response Service retrieves the flagged Subject's data including GPS Coordinates from the Mobile Network Authority and stores it in the Polling Database.

It also responds to requests from the Patrol Officers Interfaces and the Control Centers Interfaces that are tracking the flagged subject.

Polling Database.

The Polling Database stores all requests and response records to and from the Mobile Network Authority. It also stores the polling interval and number of polling as instructed by the Central Control Rest Web service. Authority System The Authority system consists of the Patrol and control center interfaces which requests and transmits data to and from the Request/Response Rest Web service.

Patrol Officers Interface.

The Patrol Officers Interface is part of the SRTS and will transmit data to and from the Request/Response Rest Web Service. It will have the capability to configure basic data requirements, but major configurations must be done by the Control Center.

Control Center Interface.

The control Center is part of the SRTS and will manage and configure all data transmitted between SRTS and the Mobile Network Authorities. This is the Admin interface of the Central Authority Interface which will be used to configure data e.g. polling intervals, number of polling requests and Polling Terminations.

If the Patrol Officer's Interface is not available, the Control Center Interface can be used to fulfill the required functionality.

Mobile Networks Authority Routing Rest Web Service.

The Mobile Network Authority Routing Rest Web Service is part of the SRTS and will transmit Subject's data between SRTS and the Mobile Networks and will be managed and maintained by the Mobile Network Communication Authority, and they will configure the service and determine what information SRTS will receive.

Internet Social Network Tracking Rest Service.

The internet Social Network Tracking Rest Service is part of the SRTS and will transmit subject's data between SRTS and Social Networks. It will be managed and maintained by the Mobile Network Communication Authority, and they will configure the service and determine what information SRTS will receive.

Location Tracker System.

This System is not part of the SRTS and is developed, managed and controlled by the Mobile Networks. It will receive, modify the subject's data and return it with the GPS Locations and any other instructions relating to the tracking Registrar Registry Rest Web Service.

The Registrar Registry Rest Web Service is part of the SRTS and will integrate with Central Control Rest Web Service, it will receive subject's data from the Registrar's application Interface and transmit Subject's (flagged or not flagged) details (e.g. Cellphone number) to the Central Control Rest Web Service which will then add to/update the Government/Authority System with the Subject's new details.

Registrar's Application Interface.

This System is not part of the SRTS and is developed, managed and controlled by the Communications registrar. The Registrar's application Interface will capture the Subject's details and transmits it to the Registrar Registry Rest Web Service.

The SRTS is an integrated system that communicates with external systems such as the Mobile networks communication authorities of which they in turn will transfer data between the mobile networks and SRTS in order to transact data between users and the central Government/Authority Systems that maintains the population records and identification Databases. The System involves the identification of subjects and data management by Government/Authorities. The SRTS consists of multiple software and sub Systems including database Systems, Web Services, Windows Services, NoSQL Software and Web Applications that is used to capture, store and manage user data on the subscriber's System and on the Government/Authority database Systems and all communications/interactions are done in real time.

The SRTS aims to address the needs for security within the Global Community by helping law enforcements to identify Criminals or ordinary persons by tracking their movements through cellphone/device tracking and location tracking by registering identifications of a person entering the subscriber's premises, which is then sent to the authorities for data management. The SRTS can also be used by Government/Authorities to profile Individuals by their movements, it can also be used to help find missing persons by identifying their last known locations and can also be used for general population management and control.

The SRTS will also be used to generate revenue by charging subscribers/Vendors of the System a premium. It does not store subject's data but simply transfers the data between the Government/Authority Systems and the Subscriber's/Vendor's Systems and will be transferred securely via network or the internet by using the available and most efficient data security technologies. IT will store transactional data in order to invoice the subscriber on an agreed interval, manage the subscriber's information and access.

SRTS will eventually be integrated into an existing ERP System (Enterprise Studio), which then can be provided as a complete solution to an Enterprise to manage their business activities in one integrated System that consists of other web applications (Modules).

Enterprise Studio will have a landing page with Advert feeds(slides) that will allow businesses to market their product by providing a link to their web site on Enterprise Studio which will be available to all users across the world that are integrated to SRTS.

System Operations. Subscriber System (Enterprise Studio).

The Subscriber which could be any enterprise that requires access control to their premises will establish an environment of which the system will operate. The System consists of a Database of which the response data from the Government/Authority Systems will be stored, managed and reports can be generated from the records of data residing in the Database, A web Application integrated with a Rest Web Service will integrate the Government/Authority Systems and the Subscriber's System by transferring data between the two environments in real-time.

The Subscriber's User interface will be a web application, written using a JavaScript Framework for performance optimization and scalability which can be accessed via the subscriber's network, if the subscriber has franchises, branches or substructures then the Application will be installed and configured to suit their environments.

SRTS will be lightweight and will transmit data in real-time, but Load balancers and other network technologies and configuration tools will be used to optimize the performance on large Subscriber's Networks if needed.

The Subscriber will register every individual or groups requesting entry to their premises by requesting their identification number (ID, Passport or Cellphone numbers), capturing it into the system and then forwarding the data including the Address and GPS coordinates of the Subscriber's premises for verification by the Government/Authority Systems. Then Government/Authority Systems will respond with data including the registered details and Official Image of the Individuals on the Government/Authority Systems. If the Subject is wanted by the Government/Authority (Police), then S TS will initiate the tracking process and will not alert the System user of the initiated process, but will alert the Control Center of the Subject's current GPS location and physical address.

If there is a security bridge at the premises the subscriber will have the ability to identify the perpetrators on their system and forward their details including their picture, reasons for submissions and comments regarding the submissions to the Police immediately, The Police will then analyze the data received from the Subscriber and flag the Subject/s for tracking if required.

The Subscriber will be able to capture visitors by groups or individually for data accuracy. When the Data is returned from the Government/Authority Systems, the user will be able to validate the visitor's details and picture in person with the image displayed on the user interface to ensure that security is not compromised. Government/Authority may request copies of these data for analysis.

SRTS Bridge Rest Service.

The SRTS Bridge Rest Service provides an integration Bridge between the Subscriber System (Enterprise Studio) and the Central Control Rest Service or SRTS Vendors/International providers and their Systems. The Vendors will have access by subscriptions and will be able to render services to their subscribers by sending/receiving requests/responses through the SRTS Bridge Rest Service.

The SRTS Bridge Rest Service will be used as an administrative tool to manage/record traffics from the Subscribers and Vendors, record usage and provide a secure gateway to the Central Control Rest Service.

Provider System. SRTS Vendor/International Providers.

SRTS Vendors/International providers is an external system that provides SRTS services to its users by transmitting data to and from the SRTS Bridge Rest Service. The Vendor could be an organization that validates or evaluates data by its identity e.g. Banks could use SRTS to validate or evaluate customer's transactions, Marketing agencies could use SRTS to collect and profile subjects' information or a Point Of Sale (POS) System could validate or evaluate Customers' identity when purchasing an item. The international provider could be another SRTS implementation in another country and integrates to the national SRTS via the SRTS Bridge or an international authority System that could use the National SRTS to validate or evaluate subjects' information.

If the subject's data is transmitted between SRTS implementations or law enforcements, then the subject's data will be in depth data transmission or as per configuration by the subject's hosting SRTS implementation.

Central Authority System.

The Central authority system is the main part of the SRTS, it will integrate with the National Population database via a NoSQL application Server which is maintained by the Government/Authority. The Government/Authority System will respond with the requested data to a request by the Central Control Rest Web Service.

Control Rest Web Service:

The Central Control Rest Web Service is part of the SRTS which will integrate with the Government/Authority System and will manage the communication between the Polling System, the Subscriber's System, the Communication Registrar's Registry System and the Government/Authority System.

It also determines if the data received should be sent for polling on the Mobile Network or logged on the log Database based on the instructions from the Government/Authority System.

Log Database.

The Log Database stores records of individuals not flagged for polling by the Government/Authority System. It contains request data from the Subscribers, Vendors, and International Providers and can be used for analysis and profiling of Subjects.

Polling Windows Service.

The Polling Windows Service retrieves instruction data of Subjects flagged for Tracking from the Polling Database and transmits them to the Mobile Network Authority.

Request/Response Rest Web Service.

The Request/Response Service retrieves the flagged Subject's data including GPS Coordinates from the Mobile Network Authority and stores it in the Polling Database It also responds to requests from the Patrol Officers Interfaces and the Control Centers Interfaces that are tracking the flagged subject.

Polling Database.

The Polling Database stores all requests and response records to and from the Mobile Network Authority. It also stores the polling interval and number of polling as instructed by the Central Control Rest Web service.

Authority System.

The Authority system consists of the Patrol and control center interfaces which requests and transmits data to and from the Request/Response Rest Web service.

Patrol Officers Interface.

The Patrol Officers Interface is part of the SRTS and will transmit data to and from the Request/Response Rest Web Service. It will have the capability to configure basic data requirements, but major configurations must be done by the Control Center.

Control Center Interface.

The control Center is part of the SRTS and will manage and configure all data transmitted between SRTS and the Mobile Network Authorities. This is the Admin interface of the Central Authority Interface which will be used to configure data e.g. polling intervals, number of polling requests and Polling Terminations.

If the Patrol Officer's Interface is not available, the Control Center Interface can be used to fulfill the required functionality.

Mobile Networks Authority Routing Rest Web Service.

The Mobile Network Authority Routing Rest Web Service is part of the SRTS and will transmit Subject's data between SRTS and the Mobile Networks and will be managed and maintained by the Mobile Network Communication Authority, and they will configure the service and determine what information SRTS will receive.

Internet Social Network Tracking Rest Service.

The internet Social Network Tracking Rest Service is part of the SRTS and will transmit subject's data between SRTS and Social Networks. It will be managed and maintained by the Mobile Network Communication Authority, and they will configure the service and determine what information SRTS will receive.

Location Tracker System.

This System is not part of the SRTS and is developed, managed and controlled by the Mobile Networks. It will receive, modify the subject's data and return it with the GPS Locations and any other instructions relating to the tracking.

Registrar Registry Rest Web Service.

The Registrar Registry Rest Web Service is part of the SRTS and will integrate with Central Control Rest Web Service, it will receive subject's data from the Registrar's application Interface and transmit Subject's (flagged or not flagged) details (e.g. Cellphone number) to the Central Control Rest Web Service which will then add to/update the Government/Authority System with the Subject's new details.

Registrar's Application Interface.

This System is not part of the SRTS and is developed, managed and controlled by the Communications registrar. The Registrar's application Interface will capture the Subject's details and transmits it to the Registrar Registry Rest Web Service.

The invention claimed is:

1. A security registry and tracking system, comprising:
at least one computing device comprising at least one hardware processor configured through execution of program instructions to:
communicate with a mobile networking and tracking system configured to:
identify a mobile device entering a premise of a subscriber network;
obtain an identification number of the mobile device;
forward the identification number to at least one governmental authority system; and
receive authentication data from the at least one governmental authority system;
transfer data between a mobile networking and tracking provider and the security registry and tracking system;
generate population records and identification databases based at least in part on a location information and the data transferred between the mobile networking and tracking provider and the security registry and tracking system; and
capture, store, and manage, in real time, user data on a subscriber system,
wherein the at least one computing device is further directed to provide load balancing based at least in part on network traffic received by the security registry and tracking system,
wherein the at least one computing device is further directed to, in response to the authentication data received from the at least one governmental authority system indicating that a subject associated with the mobile device is wanted: initiate a tracking process, abstain from alerting the mobile device of the tracking processing, and alerting a control center of current GPS coordinates and physical address of the mobile device, and
wherein the at least one computing device does not store data associated with subject and only performs transfer of the data between the mobile networking and tracking provider and the security registry and tracking system.

2. The security registry and tracking system of claim 1, wherein:
the mobile device is a cellular phone; and
the identification number is at least one of: a unique identifier, a passport number, or a telephone number of the cellular phone.

3. The security registry and tracking system of claim 1, wherein the at least one computing device is further directed to track at least one mobile object based at least in part on the location information, the at least one mobile object comprising one of: a car, an aircraft, or a vehicle having a programmable device therein.

* * * * *